(12) United States Patent
Aiello et al.

(10) Patent No.: US 6,917,130 B2
(45) Date of Patent: Jul. 12, 2005

(54) TOP COVER ATTACHABLE FLUID DYNAMIC BEARING MOTOR

(75) Inventors: Anthony J. Aiello, Aptos, CA (US); Klaus D. Kloeppel, Watsonville, CA (US)

(73) Assignee: Seagate Technology, LLC, Scotts Valley, CA (US)

(*) Notice: Subject to any disclaimer, the term of this patent is extended or adjusted under 35 U.S.C. 154(b) by 27 days.

(21) Appl. No.: 10/346,420

(22) Filed: Jan. 16, 2003

(65) Prior Publication Data

US 2003/0214193 A1 Nov. 20, 2003

Related U.S. Application Data

(60) Provisional application No. 60/378,089, filed on May 14, 2002, and provisional application No. 60/380,772, filed on May 14, 2002.

(51) Int. Cl.[7] .............................................. H02K 7/09
(52) U.S. Cl. ...................................... 310/90.5; 310/90
(58) Field of Search .................. 310/90.5, 90; 384/100, 384/107, 114, 121

(56) References Cited

U.S. PATENT DOCUMENTS

| | | | |
|---|---|---|---|
| 4,856,918 A | | 8/1989 | Inoue et al. ................. 384/610 |
| 5,108,198 A | | 4/1992 | Nii et al. ..................... 384/133 |
| 5,280,208 A | * | 1/1994 | Komura et al. ............... 310/90 |
| 5,427,456 A | | 6/1995 | Hensel ........................ 384/112 |
| 5,524,985 A | | 6/1996 | Dunfield ..................... 384/107 |
| 5,541,460 A | * | 7/1996 | Dunfield et al. ........... 310/67 R |
| 5,545,937 A | | 8/1996 | Dunfield et al. ............ 370/90.5 |
| 5,561,335 A | | 10/1996 | Dunfield et al. ........... 370/90.5 |
| 5,587,617 A | | 12/1996 | Dunfield et al. ........... 370/90.5 |
| 5,598,048 A | | 1/1997 | Dunfield et al. ........... 370/90.5 |
| 5,675,201 A | * | 10/1997 | Komura et al. ............. 310/90.5 |
| 5,806,987 A | * | 9/1998 | Nose et al. .................. 384/100 |
| 5,835,124 A | * | 11/1998 | Fukita et al. ................ 347/260 |
| 6,066,903 A | * | 5/2000 | Ichiyama ...................... 310/90 |
| 6,071,014 A | * | 6/2000 | Lee et al. .................... 384/107 |
| 6,183,135 B1 | | 2/2001 | Aiello et al. ................. 384/112 |
| 6,307,293 B1 | * | 10/2001 | Ichiyama ................... 310/90.5 |

FOREIGN PATENT DOCUMENTS

JP          62 037514          2/1987

OTHER PUBLICATIONS

International Search Report mailed on Sep. 11, 2003, for PCT patent Appl. No. PCT/US03/15509 filed on May 14, 2003, 7 pages.

* cited by examiner

Primary Examiner—Dang Le
(74) Attorney, Agent, or Firm—Morrison & Foerster LLP (57) ABSTRACT

A single thrust bearing fluid dynamic bearing (FDB) design, including a typical dynamic bearing design which has a ring-shaped or circular thrust plate mounted at or near the end of a shaft, wherein the shaft defines together with the surrounding sleeve a journal bearing by providing grooves on one of the two surfaces facing the gap between the shaft and sleeve. On the thrust plate, only one of the two surfaces is grooved to establish an active thrust bearing. The rotor is then biased against the single active thrust bearing with a constant force generated by a magnetic circuit.

18 Claims, 5 Drawing Sheets

TOP COVER ATTACHABLE FLUID DYNAMIC BEARING MOTOR

CROSS REFERENCE TO A RELATED APPLICATION

This application is based on provisional application Ser. No. 60/378,089, filed May 14, 2002, attorney docket number STL 3165.01 entitled Plateless Hybrid Stationary Shaft FDB Motor and, provisional application No. 60/380,772, designated as STL 3166.01 entitled Top Cover Attachable Single Thrust FDB Motor filed May 14, 2002. The priority of both of these provisional applications is claimed herein.

FIELD OF THE INVENTION

This application is directed to the field of fluid dynamic bearing design, and more particularly to single thrust bearing fluid dynamic bearing design.

BACKGROUND OF THE INVENTION

Disc drive memory systems have been used in computers for many years for storage of digital information. Information is recorded on concentric tracks of a magnetic disc medium, the actual information being stored in the forward magnetic transitions within the medium. The discs themselves are rotatably mounted on a spindle, while the information is accessed by read/write has generally located on a pivoting arm which moves radially over the surface of the rotating disc. The read/write heads or transducers must be accurately aligned with the storage tracks on the disk to ensure proper reading and writing of information.

During operation, the discs are rotated at very high speeds within an enclosed housing using an electric motor generally located inside the hub or below the discs. Such known spindle motors typically have had a spindle mounted by two ball bearing systems to a motor shaft disposed in the center of the hub. The bearings are spaced apart, with one located near the top of the spindle and the other spaced a distance away. These bearings allow support the spindle or hub about the shaft, and allow for a stable rotational relative movement between the shaft and the spindle or hub while maintaining accurate alignment of the spindle and shaft. The bearings themselves are normally lubricated by highly refined grease or oil.

The conventional ball bearing system described above is prone to several shortcomings. First is the problem of vibration generated by the balls rolling on the bearing raceways. This is one of the conditions that generally guarantee physical contact between raceways and balls, in spite of the lubrication provided by the bearing oil or grease. Hence, bearing balls running on the generally even and smooth, but microscopically uneven and rough raceways, transmit the rough surface structure as well as their imperfections in sphericity in the vibration of the rotating disc. This vibration results in misalignment between the data tracks and the read/write transducer. This source of vibration limits the data track density and the overall performance of the disc drive system. Vibration results in misalignment between the data tracks and the read/write transducer. Vibration limits therefore the data track density and the overall performance of the disc drive system.

Further, mechanical bearings are not always scalable to smaller dimensions. This is a significant drawback, since the tendency in the disc drive industry has been to continually shrink the physical dimensions of the disc drive unit.

As an alternative to conventional ball bearing spindle systems, much effort has been focused on developing a fluid dynamic bearing. In these types of systems lubricating fluid, either gas or liquid, functions as the actual bearing surface between a stationary shaft supported from the base of the housing, and the rotating spindle or hub. Liquid lubricants comprising oil, more complex fluids, or other lubricants have been utilized in such fluid dynamic bearings. The reason for the popularity of the use of such fluids is the elimination of the vibrations caused by mechanical contact in a ball bearing system, and the ability to scale the fluid dynamic bearing to smaller and smaller sizes.

In the field of fluid dynamic bearing motors for use in hard disc drives, some prior systems including, but not limited to, small form factor motor designs for mobile applications have been limited by stringent power and ever tightening track density requirements. In the traditional "single-plate" FDB design, axial stiffness is provided by two equally opposing thrust bearings and the bearing lubricant is retained by closing one bearing end and placing a capillary seal at the opposing end. This traditional approach results in two thrust bearing gaps at large diameters, thereby increasing bearing drag and overall motor power. It also disallows attachment to the disk drive enclosure's top cover, which improves the motor's angular stiffness and dynamic performance as seen with ball bearing motor designs in the past and the more costly conical fluid dynamic bearing motors of the present.

Therefore, the search for a design which reduces the power losses associated with dual thrust bearings. It further is advantageous to seek a design wherein the shaft is attachable to the top cover as well as to the base to enhance the stiffness of the overall design.

SUMMARY OF THE INVENTION

The present invention is intended to provide a fluid dynamic bearing assembly especially useful in a high speed spindle motor assembly.

A further advantage of the invention and objective thereof is to provide a fluid bearing arrangement with diminished power consumption.

These and other embodiments, advantages and objectives are achieved by providing a single thrust bearing fluid dynamic bearing (FDB) design, wherein beginning with a typical dynamic bearing design which comprises a ring-shaped or circular thrust plate mounted at or near the end of a shaft, wherein the shaft defines together with the surrounding sleeve a journal bearing by providing grooves on one of the two surfaces facing the gap between the shaft and the sleeve. On the thrust plate, only one of the two surfaces is grooved to establish an active thrust bearing. The rotor is then biased against the single active thrust bearing with a constant force generated by a magnetic circuit.

In the case where the single thrust bearing is defined between a counterplate axial surface facing an end of the shaft and the facing surface of the thrust plate, the magnetic circuit is typically an attraction circuit between the base and hub or sleeve; where the single thrust bearing is defined between a sleeve axially facing surface and a thrust plate, a magnetic repulsion circuit between the base and hub or sleeve is established. However, motor stator/motor magnet interaction can also be utilized by axially offsetting the magnet relative to the stator.

The single thrust bearing comprises either a spiral groove pattern or an asymmetrically biased herring bone/chevron style pattern, such that the pressure generated by a journal bearing asymmetry self-balances when the axial load equilibrates at a given thrust bearing fly height (wherein the thrust bearing asymmetry pumping force increases as the thrust gap closes).

In the preferred approach to the design the system stiffness and related dynamic performance is also achieved by attaching the shaft to the drive enclosures top cover. In designs where the thrust plate and associated counterplate is adjacent the cover, the shaft attaches to the cover through a hole in the counterplate. In an inverted design where the thrust plate and associated counterplate are adjacent the drive base, then the shaft is extended through the counterplate or a screw or other fastener is threaded through the counterplate to the shaft, and a screw or other fastener is also fixed into the opposite end of the shaft through the top cover. (Press fit or other attachment means may also be used). In either event, lubricant is retained at this breach through the counterplate by a radial capillary seal which is preferably formed by a shallow counter sink on the shaft or counterplate to form the necessary diverging surfaces. This radial divergence of the walls of this capillary seal retains the lubricant by means of miniscus surface tension as well as centrifugal force in the operating/rotating condition. Also, the means for attaching the draft to the cover is not a specific part of the invention.

Other features and advantages of this invention will be apparent to a person of skill in the art who studies the exemplary embodiments of the invention which follow below.

BRIEF DESCRIPTION OF THE DRAWINGS

The description of the embodiments is given with reference to the following drawings, wherein.

DETAILED DESCRIPTION OF THE PREFERRED EMBODIMENTS

Reference will now be made in detail to exemplary embodiments of the invention, examples of which are illustrated in the accompanying drawings. While the invention will be described in conjunction with these embodiments, it is to be understood that the described embodiments are not intended to limit the invention solely and specifically to only those embodiments, or to use solely in the disc drive spindle motor which is illustrated. On the contrary, the invention is intended to cover alternatives, modifications and equivalents which may be included within the spirit and scope of the invention as defined by the attached claims. Further, both hard disc drives, in which the present invention is especially useful, and spindle motors, where the invention is also especially useful are both well known to those of skill in this field. In order to avoid confusion while enabling those skilled in the art to practice the claimed invention, this specification omits such details with respect to known items.

Figure 1:
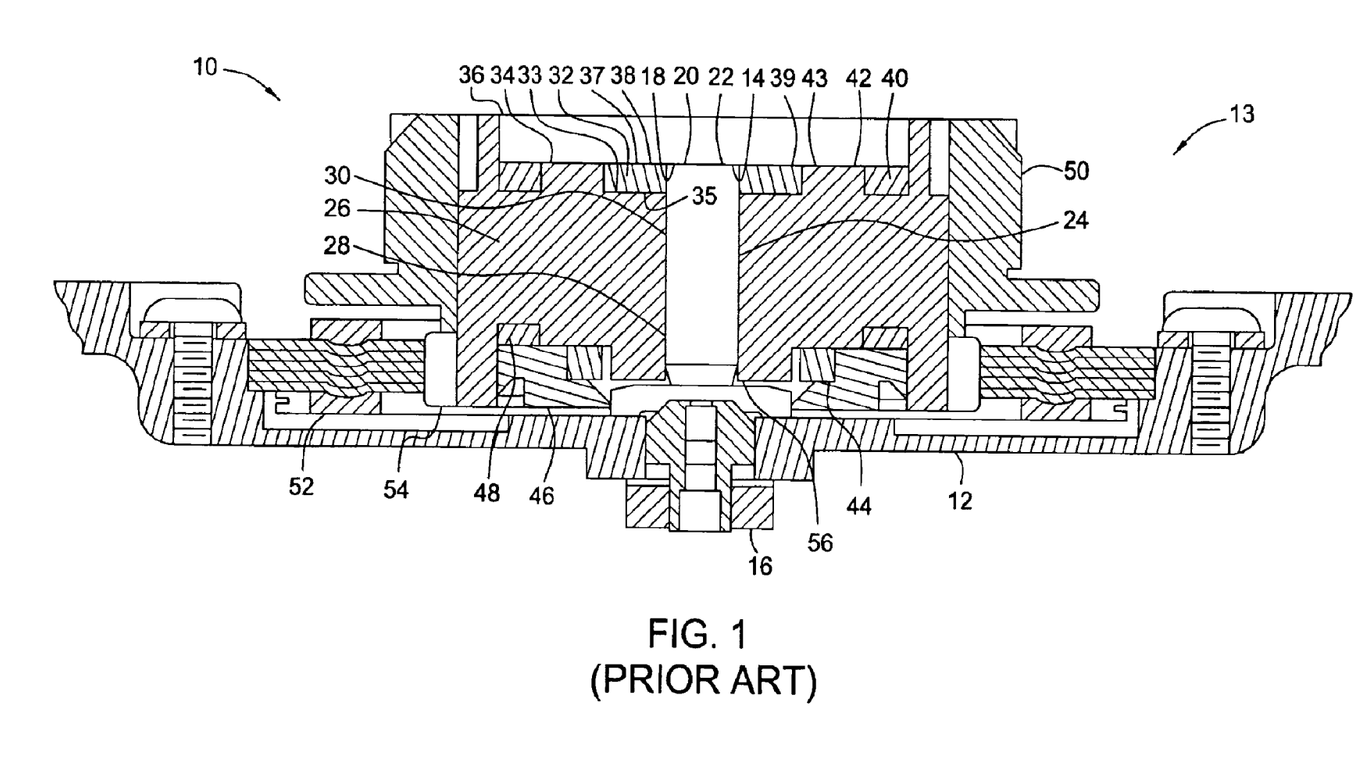
FIG. 1 is a vertical sectional view of a known spindle motor design in which the present invention is useful.
Figure 3:
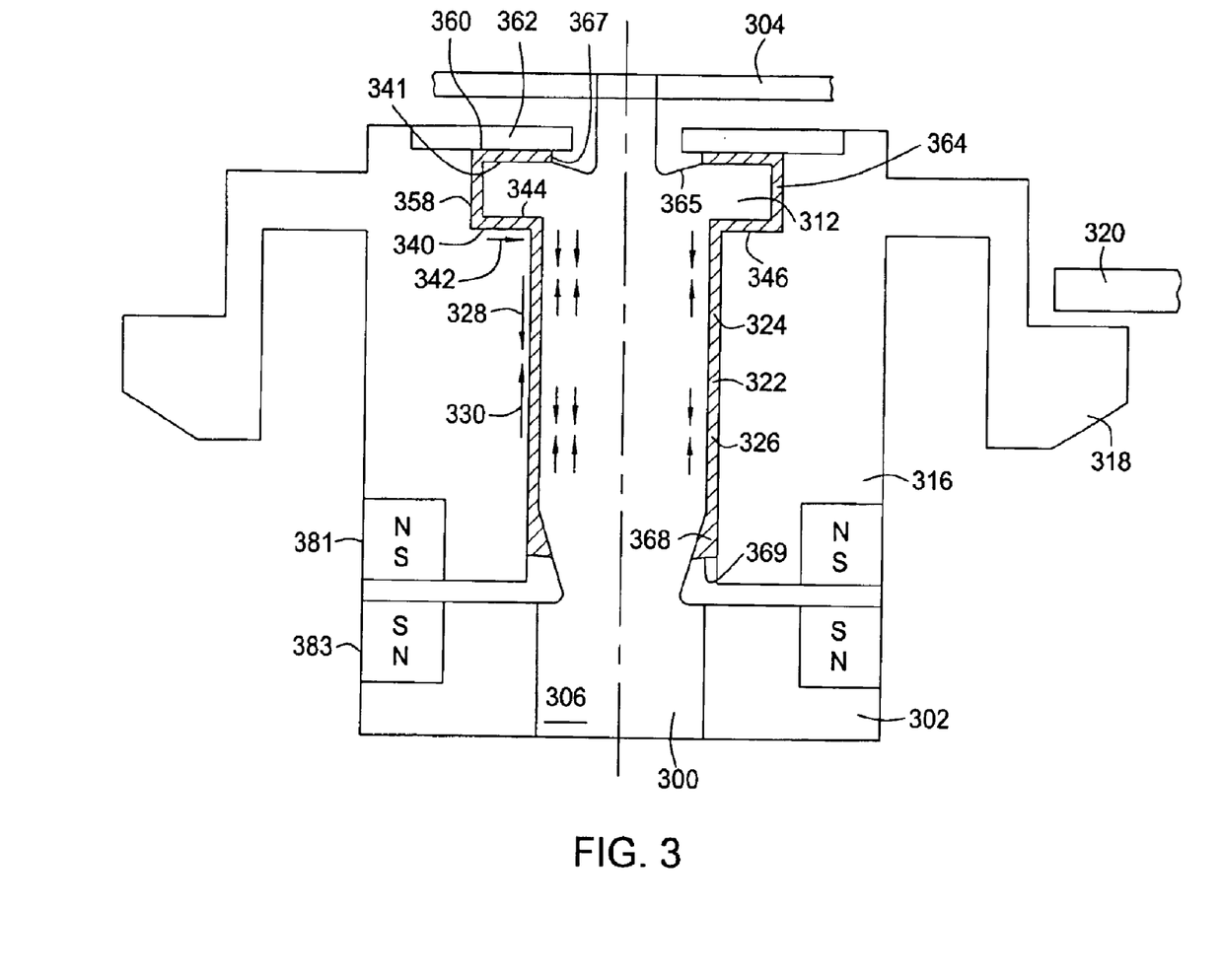
FIG. 3 is a vertical sectional view of a first embodiment of the present invention.
Figure 4:
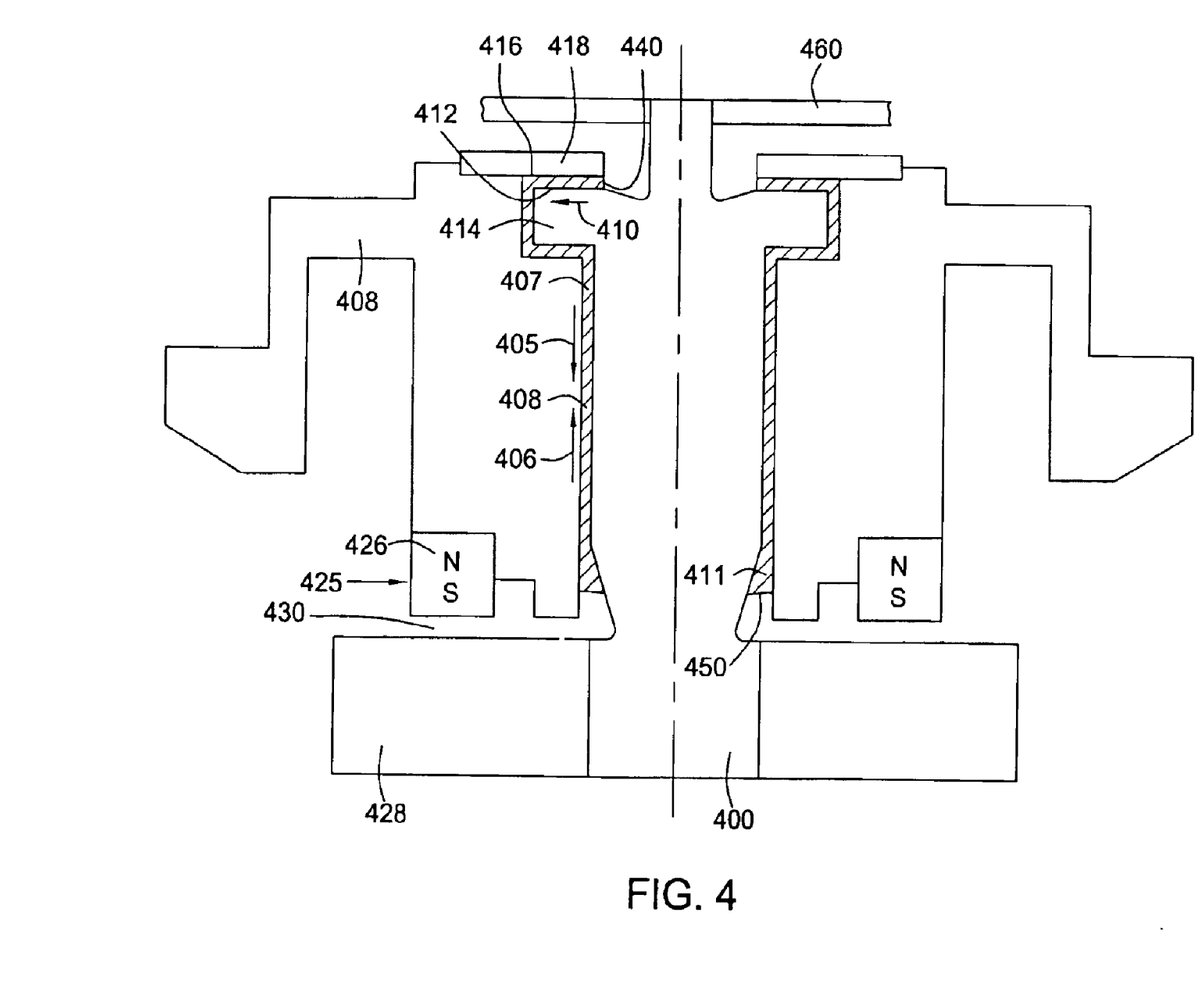
FIG. 4 is a vertical section of an alternative embodiment of the present invention.
Figure 5:
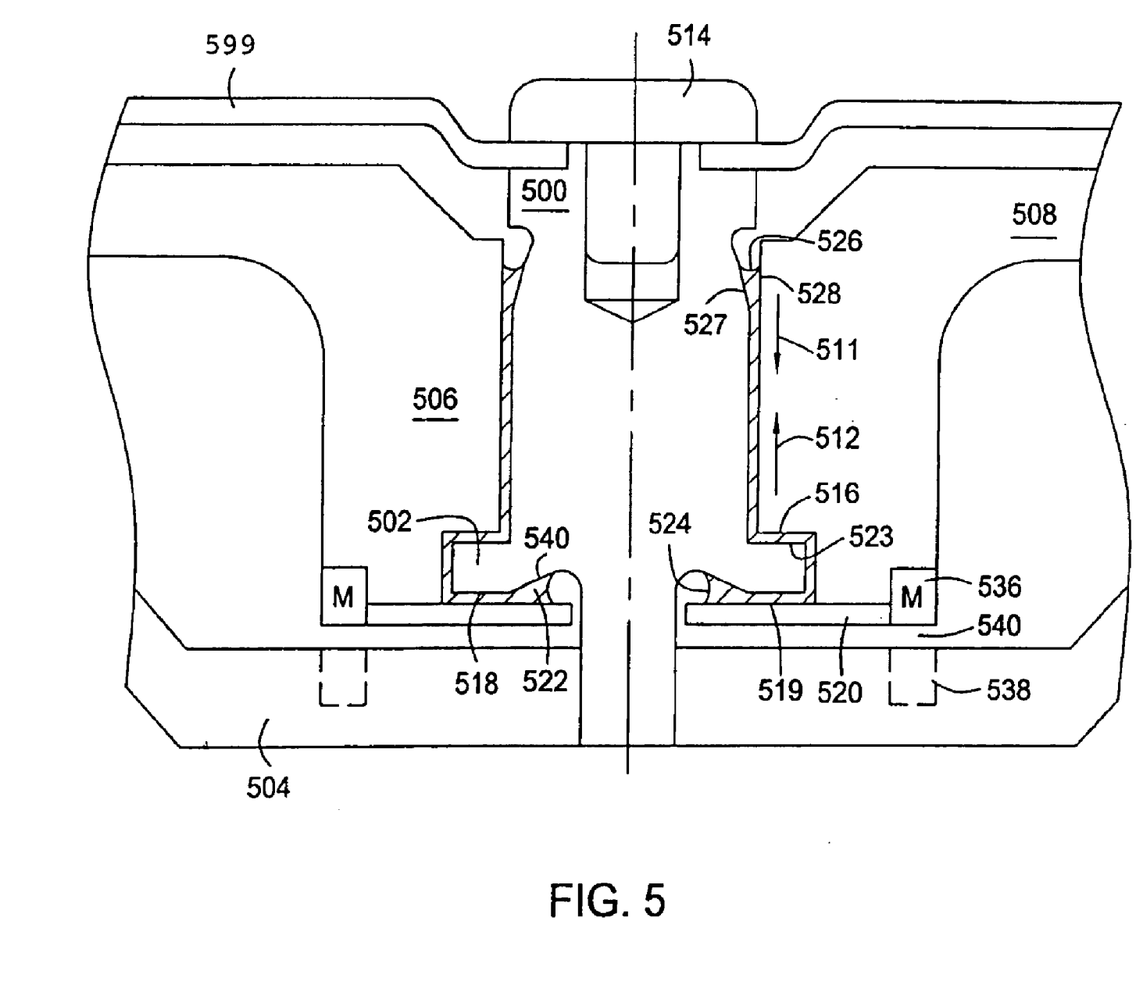
FIG. 5 is a vertical sectional view of yet another alternative embodiment of the invention in which the fixed shaft is inverted relative to the base.

FIG. 1 is a cross section through one embodiment of a spindle motor assembly which may readily be adapted to incorporate a fluid dynamic bearing arrangement according to the present invention. It is described to establish the state of the prior art and fluid dynamic bearings, as well as the environment in which this invention is useful. More specifically, the spindle motor shown in FIG. 1 is of a fixed shaft design; the embodiments of FIGS. 3, 4 and 5 are also fixed shaft designs.

FIG. 1 illustrates a cross section through a spindle motor assembly, comprises a base 12 and a hub assembly 13. A shaft 14 is mounted to the base 12 by a nut 16.

The outer surface of the shaft 14 and the bore of the journal sleeve 26 together form fluid dynamic journal bearings 28, 30. The dual reference numbers are used because the journal bearings are typically in two sections. The bearing gaps at the fluid dynamic journal bearings, 28, 30 are typically between 0.003 and 0.006 mm. The journal bearings 28, 30 each include a grooved surface. The grooved surfaces may be provided either on the outer surface of the shaft 14, or the inner bore surface of the journal sleeve 26, and journal 28 is typically asymmetric.

A thrust plate 32 is press fitted or formed or otherwise attached to an end of the shaft 14 and extends transversely to the shaft 14. The thrust plate 32 is circular in form, the thrust plate 32 defines a first axial thrust surface 33 which, together with a facing sleeve thrust surface 35 extending transverse to the journal bearing defines a first fluid dynamic thrust bearing 34 in the gap between the two surfaces. As can be seen from FIG. 1, the thrust surface 35 at bearing 34 extends transversely to the journal at 30, and the thrust bearing gap is connected to that journal bore.

A counterplate 36 is press fitted to or otherwise supported by the journal sleeve 26 adjacent the thrust plate surface 37 which is distal from the journal bearing 28, 30. The counterplate 36 has a surface 39 which corporates with the thrust plate surface 37 to define a gap in which fluid is maintained during rotational operation of the shaft and sleeve. Therefore, the counterplate 36 is sealed to the journal sleeve 26 by a O-ring 40 or other means to prevent any loss of the fluid which appears in the gap between counterplate and thrust plate.

The hub assembly 13 is rotated with respect to the base 12 in use by means of an electromagnetic motor. The electromagnet motor comprises a stator assembly 52 mounted to the base 12, and a magnet 54 mounted to the journal sleeve 26.

As can be appreciated from FIG. 1, the hub assembly 13, which generally comprises the journal sleeve 26, hub 50, counterplate 36, and first and second porous lubricant reservoirs 42 and 44, is supported for rotation relative to the base 12 and shaft 14 on fluid dynamic bearings 28, 30, 34, and 38.

Figure 2:
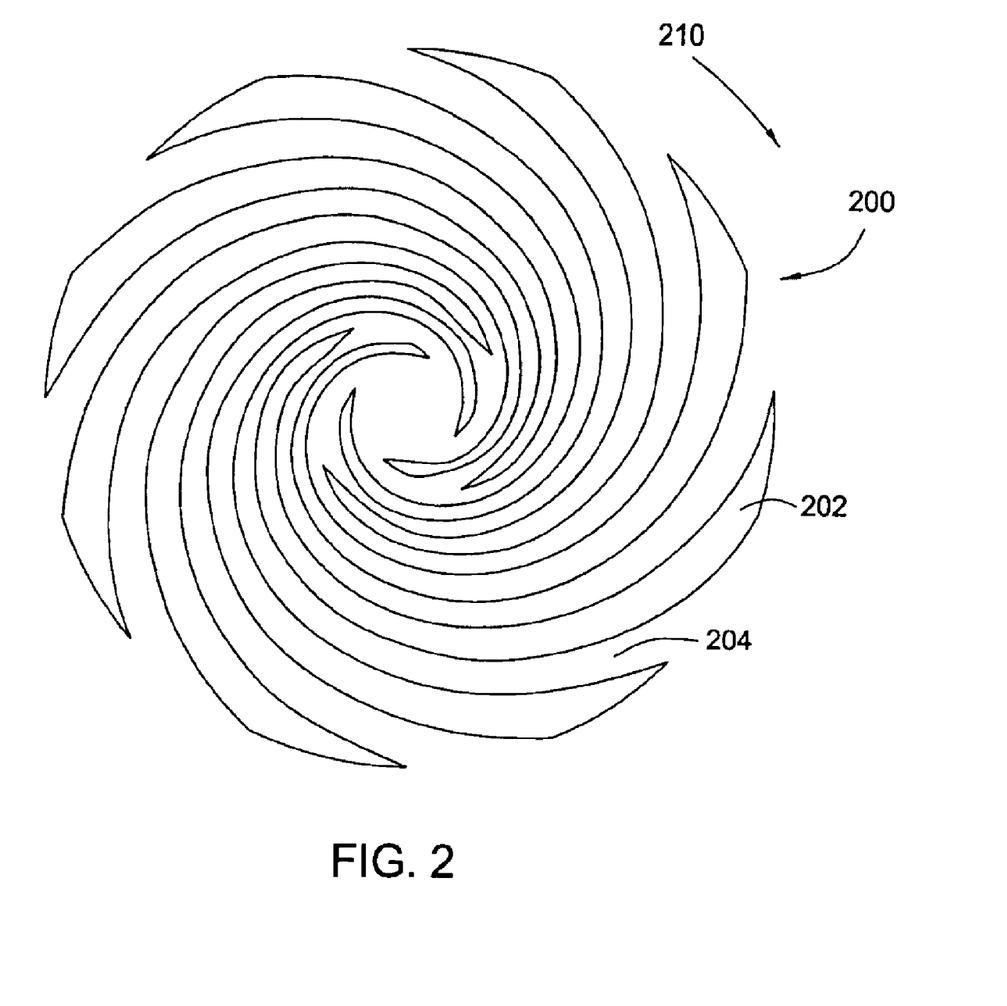
FIG. 2 is a plan view of a thrust plate groove design useful in the embodiment of FIG. 1.

The operation of a fluid dynamic bearing can best be understood by reference to FIG. 2, which illustrates a plan view of one of the surfaces of a fluid dynamic thrust bearing., The illustrated fluid dynamic bearing surface, generally indicated by the numeral 200, comprises a series of alternating grooves 202 and lands 204.

A fluid dynamic thrust bearing is formed when the bearing surface 200 is placed adjacent to an opposed bearing surface with a film of lubricant gas or air between the two surfaces. When the bearing surface 200 is rotated in the direction 216, the grooves 202 and lands 204 tend to draw fluid from the outside of the pattern. This creates a radial pressure distribution within the lubricant which serves to keep the bearing surfaces apart under external loading.

By varying the pattern of grooves 202 and the lands 204 in a known fashion, the pressure distribution across the bearing can be varied.

The grooves 202 and lands 204 may be formed in the fluid dynamic bearing surface by any number of means including, for example, chemical machining or stamping.

Although the operation of a fluid dynamic bearing has been discussed with reference to a fluid dynamic thrust bearing, it will be appreciated that the above principles can be applied to a fluid dynamic journal bearing such as the fluid dynamic journal bearings 28 and 30 illustrated in FIG. 1. In particular, the pattern of the grooves and lands of the fluid dynamic journal bearings 28, 30 can be arranged to create a net flow during start-up of lubricant in a direction along the longitudinal axis of the shaft 14, i.e. towards or away from the base 12; in this case it is toward the thrust bearing.

It will also be appreciated that a fluid dynamic bearing is not limited to the use of a pattern, as shown in FIG. 2. A sinusoidal pattern may be used as an alternative.

Referring again to FIG. 1, in use the hub assembly 13 (generally comprising the journal sleeve 26, counterplate 36, porous lubricant reservoirs 42 and 44 and the hub sleeve 50) is rotated relative to the base 12 by means of an electromagnetic motor comprising stator assembly 52 and magnet 54. The hub assembly is supported for smooth rotation on the shaft 14 and thrust plate 32 by the pressures generated in the lubricant at the fluid dynamic bearings 28, 30, 34 and 38.

The present design seeks to minimize or diminish the power consumption which is typically associated with the use of a two-sided thrust bearing supported from a shaft. The power consumption being dealt with herein comes from the fact that in the typical design which uses a thrust plate with a bearing on either side of the thrust plate provides the desired level of axial stiffness. The viscosity of the fluid used in the gap is relatively high at low temperatures, thus the drag on the groove surfaces of the dual thrust bearing design i.e., one with grooves on both axially facing surfaces is quite high. The approach herein is of using a single fluid dynamic thrust bearing, thereby reducing the power consumed, with the necessary axial force biasing to maintain fluid pressure and gap spacing and the like being provided in part by a magnetic circuit and/or in part by asymmetric bearing design. This approach also enables top cover attachment of the shaft, which provides added stability to the system.

Referring then next to FIG. 3, an exemplary embodiment is shown here including a stationary shaft 300 extending from a base or base insert 302 and extending to the top cover 304 of the disc drive. The base section 306 of the shaft 300 can engage the base 302 in any of the number of known ways; similarly, the shaft can either be physically extended, or a screw, interferece fit, or other fixing device.

As shown, the shaft 300 supports a thrust plate 312 at end thereof. The shaft 300 is fixed; a sleeve 316 supporting a hub 318 rotates around the shaft, with the hub supporting one or more discs 320 for rotation. The sleeve 316 is supported for rotation by journal bearing 322 which as described above comprises grooves on either the outer surface 324 of the shaft or the inner surface 326 of the sleeve. Typically, the grooves are in two sets represented by the arrows 328, 330. In this embodiment, where a single thrust bearing is used to support the thrust plate and shaft, the journal bearing is biased or asymmetric as represented by the length of the arrow 330 exceeding the length of the arrow 328 so that a net pumping pressure along the shaft by the journal bearing toward the thrust plate 312 is established. This asymmetric journal bearing can be defined in a number of ways and this invention is not limited to a specific design.

According to the present approach, rather than utilize a thrust bearing on both the top 340 and the bottom 341 axially facing surfaces of the thrust plate 312, only a single thrust bearing represented by the arrow 342 is established. According to this approach, this embodiment which includes a single thrust bearing generally indicated at 342, which is established by grooves on one of the two surfaces 344 of the thrust plate or 346 of the sleeve is in this embodiment biased toward the journal bearing. These grooves are preferably a spiral configuration but are not limited to this approach. Further, it will be understood that the asymmetric bias of the journal bearing 330 is sufficient to maintain the fluid both in this section of the gap which is coupled to the journal bearing as well as to the axially oriented gap section 358 which extends past the radially end of the thrust plate and into the ungrooved region 341 between the axial surface 341 of the thrust plate 312 and the facing surface 360 of counterplate 362. Loss of fluid from this region is diminished by a radial capillary seal 364 formed in this same region between the generally axial surface 341 of the thrust plate and the facing surface 360 of the counterplate. Specifically, a shallow counter sink 365 on the shaft or thrust plate establishes a divergence between the surface 341 and the facing surface 360 so that miniscus surface tension 367 is established; this miniscus surface tension 367 as well as the centrifugal force which exists under operating conditions when the sleeve and counterplate are rotating relative to the shaft maintains the fluid in all of the gaps. A capillary seal 368 is also formed at the opposite end of the journal bearing 328, 330 by the generally diverging surfaces of the outer surface 324 of the shaft and the inner surface 326 of the sleeve in the region of the capillary seal, allowing the formation of a miniscus 369 in this region. Although this seal design is preferred, other sealing means are feasible within the scope of the invention.

It bears repeating that the single thrust bearing 342, which is defined by either a spiral groove pattern or an asymmetrically herring bone/chevron style pattern or similar pattern, establishes a pressure such that the pressure generated by the deliberate journal bearing 330 asymmetry self-balances when the axial load equilibrates at a given thrust bearing fly height. That is, as the sleeve 316 rotates over the shaft, and fluid is pumped by the journal bearing 328, 330 and the thrust bearing 342, then the thrust bearing asymmetry pumping force increases as the thrust gap closes. To balance this, and provide biasing of the rotor against the remaining thrust bearing, a constant force magnetic circuit is provided to establish an axial force on the shaft. In a preferred form, this comprises a magnet 381 generally annular in shape and supported on the sleeve generally aligned with or outboard of the thrust bearing 346, and a cooperating magnet 383 also annular in shape and supported from the base or base insert 302. This magnetic repulsion circuit is used where the single thrust bearing is located on the sleeves axial surface and 346 and the facing thrust plate surface 344 which is facing the base 302. Other magnetic circuits or placements of the magnets are of course possible, such as offset of the motor magnet from the stator, the objective being to axially balance a magnetic thrust bearing against a single thrust bearing on the thrust plate. Journal bearing is biased so that the spiral thrust bearing can balance the pressure by adjusting its gap or fly height against the magnetic bearing. The capillary seals 369, 367 at the top and bottom of the motor define the ends of a continuous gap around the thrust plate 312, via gap sections 344, 358 and 360 and through the journal bearing gap 322, thereby allowing for top cover attachment by extending shaft axially past the seals.

It further appears that with such an approach, that other benefits including rotor center of gravity alignment with the journal bearing and the elimination of a need for a recirculation path through the thrust plate, are also established. It should also be noted that asymmetric bearing lengths, bearing gaps, and the like are to be designed in accordance with normal practice in the art; otherwise a path from the end of the shaft through the off axis or thrust bearing may be needed).

An alternative embodiment is shown in FIG. 4 where a magnetic attraction circuit established by a magnet 426 located across a defined gap 430 from a base or similar magnetically conducting region 428 is used to establish a magnetic bias which balances against a single thrust bearing 410 which in this case is defined between an axial surface 412 distal from the journal bearing and a facing axial surface 416 of counterplate 418. In establishing such a thrust bearing, typically would be defined to pump away from the opening 440 between the counterplate 418 and the thrust plate 414, grooves may be defined on either the thrust plate axial surface 412 or the counterplate surface 416.

As previously described, the hub 408 is supported for rotation about the shaft 400 by an asymmetric journal bearing which typically comprises two sections, 405 and 406 each of which may include one or more groove patterns. The journal bearing is established in the gap 407 between the surface 411 of sleeve 400 and the facing surface 409 of hub 408. By properly establishing the groove pattern on either one of these surfaces, an asymmetrical pumping action away from the capillary seal which is established between radially diverging surfaces of the gap surfaces 408, 411 is established to maintain the proper gap spacing with rotation of the hub relative to the sleeve. Once again, as in the previous embodiment, it is immediately apparent that by either extension of the shaft 400 or a screw or other attachment device not shown herein, the cover 460 can be attached to the axially distal end of shaft from the base 428, thereby providing substantial radial and angular axially stability to the system.

Yet in another embodiment of the invention which in general terms is inverted relative to the previous embodiments is shown in FIG. 5. Once again, the embodiment comprises a stationary shaft 500 supported from a base 504, and fastened at its opposite end by a screw or any other appropriate welding or other appropriate means to the drive top cover 599. In this embodiment, the shaft supports or has supported thereon or integrated therewith at an end adjacent the base rather than a cupper. A thrust plate 502. A continuos fluid gap extends between a capillary seal 526 defined between an outer surface 527 of the shaft and an inner surface 528 of the sleeve 506 and extending continuously along the shaft and around the thrust plate to end in a second capillary seal defined between an axial surface 518 of the thrust plate distal from a journal bearing 511, 512, and a cooperating surface 519 of counterplate 520. As with the previous embodiments, the grooves defined on either of the surfaces 527, 528 are defined to established an asymmetric pressure bias toward the thrust plate; as with the previous embodiments, a single thrust bearing is defined between either the axially distal surface 518 and the counterplate surface 519 or between the axial surface 516 of the sleeve 506 and the cooperating surface 523 of the thrust plate 502. Also as in previous embodiments, a magnetic circuit is established, as generally referenced by the blocks M, 536, 538 across a gap 540 between the sleeve 506 and the base 504. The necessary counter force to balance the of a single thrust plate is established by this magnetic circuit which may be either a circuit of attraction or repulsion, including a stator/magnet offset.

The other features and advantages described with respect to the previous embodiment achieved herein. Thus, one or more of the advantages of reduced power loss. An attachment of the enclosure top cover by the introduction of a separate second lubricant seal at the thrust bearing end achieved. Centripetal seal perpendicular to spin axis requires little axial space.

System stiffness and related dynamic performance is improved by attaching the shaft to the drive enclosures top cover through the opening which now can be found in the counterplate 520. Lubricant is prevented from exiting through this breach by the radial capillary seal which is typically formed by a shallow counter sink equivalent surface 540 on either the shaft/thrust plate or the counter plate. This second capillary seal retains the lubricant by means of meniscus surface tension as well as centripetal force which serves to maintain the fluids during the operating/rotating condition. It can further be seen that this embodiment will provide for better rotor center of gravity alignment, and elimination of the need for fluid recirculation paths in these preferred embodiments.

Note also that other embodiments obvious to one skilled in the art may induce flow (non-self balancing groove pumping directions for instance); and therefore need recirculation paths as known in the art. Therefore, the scope of this invention is to be limited only by the following claims:

What is claimed is:

1. A fluid dynamic bearing arrangement comprising a fixed shaft adapted to be supported between a base and a top cover plate and including a thrust plate supported from the shaft between a journal bearing and the top cover plate, the second end of the shaft being adapted to be fastened to the top cover, the fluid bearing arrangement further comprising a sleeve rotating over the shaft and defining a gap including the journal bearing between an inner surface of the sleeve and an outer surface of the shaft, fluid in the gap between the sleeve and the shaft end thrust plate supporting the sleeve for rotation around the shaft, fluid bearing means including said gap supporting said sleeve for rotation over said shaft and a single axially directed thrust bearing defined between an axially facing surface of the shaft and a facing surface of either the sleeve or counterplate, and magnetic biasing means for maintaining the gap between the thrust plate and the sleeve and the thrust plate and a counterplate during rotation of the sleeve over the shaft and thrust plate.

2. A fluid dynamic bearing arrangement as claimed in claim 1 wherein the thrust bearing is defined between the axially directed thrust plate surface facing the journal bearing and the axially directed surface of the sleeve.

3. A fluid dynamic bearing arrangement as claimed in claim 2 wherein the magnetic bearing means comprises a magnet supported from the sleeve facing a magnet supported from the base across a defined gap to establish a magnetic repulsion force which maintains gap axial width in rotational operation.

4. A fluid dynamic bearing arrangement as claimed in claim 2 further comprising an asymmetric journal bearing pumping fluid in the gap between the sleeve and the shaft toward the thrust bearing.

5. A fluid bearing arrangement as claimed in claim 4 comprising a radial centrifugal capillary seal between the axially facing surface of the thrust plate and the facing surface of the counterplate, and defined by gradually diverging region surfaces of the thrust plate surface and the counterplate surface, fluid being retained by a meniscus formed between the gradually diverging surfaces.

6. A fluid bearing arrangement as claimed in claim 1 wherein the single thrust bearing is defined in a gap between the axially facing surface of the thrust plate and the facing surface of the counterplate.

7. A fluid dynamic bearing as claimed in claim 6 further comprising a magnet supported from at least one of the sleeve or the base across a defined gap from the other of the sleeve and the base, the magnet establishing a magnetic attraction force or generating an attraction force to stabilize the stiffness of the fluid dynamic bearing arrangement.

8. A fluid dynamic bearing arrangement as claimed in claim 6 further comprising an asymmetric journal bearing, said journal bearing pumping fluid in the gap between the sleeve and the shaft toward the thrust bearing.

9. A fluid bearing arrangement as claimed in claim 8 comprising a radial capillary seal between the axially facing surface of the thrust plate and the facing surface of the counterplate, and defined by gradually diverging regions surfaces of the thrust plate surface and the counterplate surface, fluid being retained by a meniscus formed between the gradually diverging surfaces.

10. A fluid dynamic bearing arrangement as claimed in claim 1 further including an asymmetric journal bearing pumping fluid in the gap between the sleeve and the shaft toward the thrust bearing.

11. A fluid bearing arrangement comprising a fixed shaft adapted to be supported between a base and a top cover plate and including a thrust plate supported from the shaft between a journal bearing and the base, the second end of the shaft being adapted to be fastened to the cover plate, the fluid bearing arrangement further comprising a sleeve rotating over the shaft and defining a gap between an inner surface of the sleeve and an outer surface of the shaft, fluid in the gap between the sleeve and the shaft end thrust plate supporting the sleeve for rotation around the shaft, the fluid bearing supporting said sleeve for rotation relative to said shaft, a single axially directed thrust bearing defined between an axially facing surface of the shaft and a facing surface of the sleeve or counterplate, and a magnetic biasing element for maintaining the gap between the thrust plate and the sleeve and the thrust plate and a counterplate during rotation of the sleeve relative to the shaft and the thrust plate.

12. A fluid bearing arrangement as claimed in claim 11 wherein the fluid bearing further comprises a journal bearing asymmetrically biased to pump toward the thrust plate.

13. A fluid bearing arrangement as claimed in claim 12 including a single thrust bearing defined in a gap between an axially facing surface of the thrust plate and a facing surface of the counterplate.

14. A fluid bearing arrangement as claimed in claim 12 comprising a radial capillary seal defined between the axially facing surface of the thrust plate and the facing surface of the counterplate and defined by gradually diverging regions surfaces of the thrust plate surface and the counterplate surface, fluid being retained by a meniscus formed between the gradually diverging surfaces.

15. A fluid dynamic bearing arrangement as claimed in claim 11 wherein the magnetic bearing element comprises a magnet supported from the sleeve facing a magnet supported from the base across a defined gap to establish a magnetic repulsion circuit which maintains gap spacing and thereby power consumption in rotational operation.

16. A fluid dynamic bearing as claimed in claim 11 further comprising a magnet supported from at least one of the sleeve or the base across a defined gap from the other of the sleeve and the base, the magnet establishing a magnetic a action circuit to stabilize the stiffness and power consumption of the fluid bearing arrangement.

17. A fluid dynamic bearing arrangement as claimed in claim 11 further including an asymmetric journal bearing, said journal bearing pumping fluid in the gap between the sleeve and the shaft toward the thrust bearing.

18. A fluid bearing arrangement as claimed in claim 17 comprising a radial centrifugal capillary seal defined between the axially facing surface of the thrust plate and the facing surface of the counterplate and defined by gradually diverging regions surfaces of the thrust plate surface and the counterplate surface, fluid being retained by a meniscus formed between the gradually diverging surfaces.

\* \* \* \* \*